United States Patent
Glissmeyer et al.

(10) Patent No.: US 9,921,854 B1
(45) Date of Patent: *Mar. 20, 2018

(54) RUN-TIME LIMITATIONS OF SOFTWARE APPLICATIONS BASED ON USER CHARACTERISTICS

(71) Applicant: Amazon Technologies, Inc., Seattle, WA (US)

(72) Inventors: Nathan Brent Glissmeyer, Seattle, WA (US); Ethan Zane Evans, Snoqualmie, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/943,359

(22) Filed: Nov. 17, 2015

Related U.S. Application Data

(63) Continuation of application No. 13/929,566, filed on Jun. 27, 2013, now Pat. No. 9,223,586.

(51) Int. Cl.
*G06F 17/30* (2006.01)
*G06F 9/44* (2018.01)

(52) U.S. Cl.
CPC .............. *G06F 9/4421* (2013.01); *G06F 9/44* (2013.01)

(58) Field of Classification Search
CPC .................................. G06F 9/4421; G06F 9/44
See application file for complete search history.

(56) References Cited

U.S. PATENT DOCUMENTS

| | | |
|---|---|---|
| 9,223,586 B1 * | 12/2015 | Glissmeyer ........... G06F 9/4451 |
| 2007/0264981 A1 | 11/2007 | Miller |
| 2008/0086345 A1 * | 4/2008 | Wilson ................. G06Q 10/063 705/7.11 |
| 2008/0188201 A1 | 8/2008 | Irii |
| 2009/0006418 A1 * | 1/2009 | O'Malley .......... G06F 17/30902 |
| 2009/0264101 A1 | 10/2009 | Jeong et al. |
| 2012/0079606 A1 | 3/2012 | Evans et al. |
| 2012/0253939 A1 | 10/2012 | Grigoriev |
| 2012/0254042 A1 | 10/2012 | Ludemann |
| 2012/0314853 A1 | 12/2012 | Pansari et al. |
| 2012/0324052 A1 | 12/2012 | Paleja et al. |
| 2013/0007665 A1 | 1/2013 | Chaudhri et al. |

* cited by examiner

*Primary Examiner* — Krisna Lim
(74) *Attorney, Agent, or Firm* — K&L Gates LLP

(57) ABSTRACT

An application manager provides anonymized user profile information to third party adaptive software applications. As a result, a software developer may produce a single software application that is adapted to run in a first mode providing full-functionality for use by adults and a second mode providing appropriate privacy and content restrictions for use by children. The mode is selected at run-time based on the anonymized user profile information received from the application manager.

20 Claims, 5 Drawing Sheets

RUN-TIME LIMITATIONS OF SOFTWARE APPLICATIONS BASED ON USER CHARACTERISTICS

CROSS-REFERENCE TO RELATED APPLICATIONS

This application is a continuation of prior U.S. application Ser. No. 13/929,566, filed Jun. 27, 2013, which issued as U.S. Pat. No. 9,223,586 on Dec. 29, 2015, the disclosure of which is incorporated herein by reference in its entirety.

BACKGROUND

The use of computing devices by children has increased steadily since the introduction of personal computers, and, more recently, touch-enabled computing devices such as smartphones and tablet computers which provide a simple user interface that is easy for children to operate with little or no formal training or supervision. This increased usage of computing devices by children has raised privacy and protection concerns. In the United States, the Children's Online Privacy Protection Act of 1998 (COPPA) provides federal regulations concerning children's online privacy. COPPA applies to operators of commercial websites and online services (including mobile applications), directed to children under the age of 13 that collect, use, or disclose personal information from children. Operators covered by COPPA are required to maintain compliance with an extensive list of requirements, including the obligation to provide a comprehensive online privacy policy and direct notice to parents to obtain verifiable parental consent before collecting personal information online from children.

These types of privacy requirements can be difficult to understand and burdensome to implement and maintain, particularly for small software developers without access to legal counsel. Accordingly, there is a need for improved systems and methods for addressing privacy concerns.

DETAILED DESCRIPTION

In the following description, reference is made to the accompanying drawings which illustrate several embodiments of the present invention. It is understood that other embodiments may be utilized and mechanical, compositional, structural, electrical, or operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure may improve the ability of software developers and platform providers to provide a safe and appropriate experience for users and to maintain compliance with corporate policies and governmental regulations. In accordance with embodiments of the present invention, a application manager module provides anonymized user profile information to third party adaptive software applications. As a result, a software developer may produce a single adaptive software application that adapts at run-time to operate in a first mode providing appropriate privacy and content restrictions for use by children and a second mode providing full functionality for use by adults. The mode may be selected at run-time based on the anonymized user profile information received by the third party adaptive software application from the application manager module. The third party adaptive software application and the third party software developer never receive user-identifying information. As a result, the third party software developer can provide software applications for use by all ages in full compliance with privacy requirements, without being burdened by the need to maintain detailed and up-to-date compliance efforts to ensure that the privacy requirements for properly handling personally-identifiable information about children are met.

Figure 1:
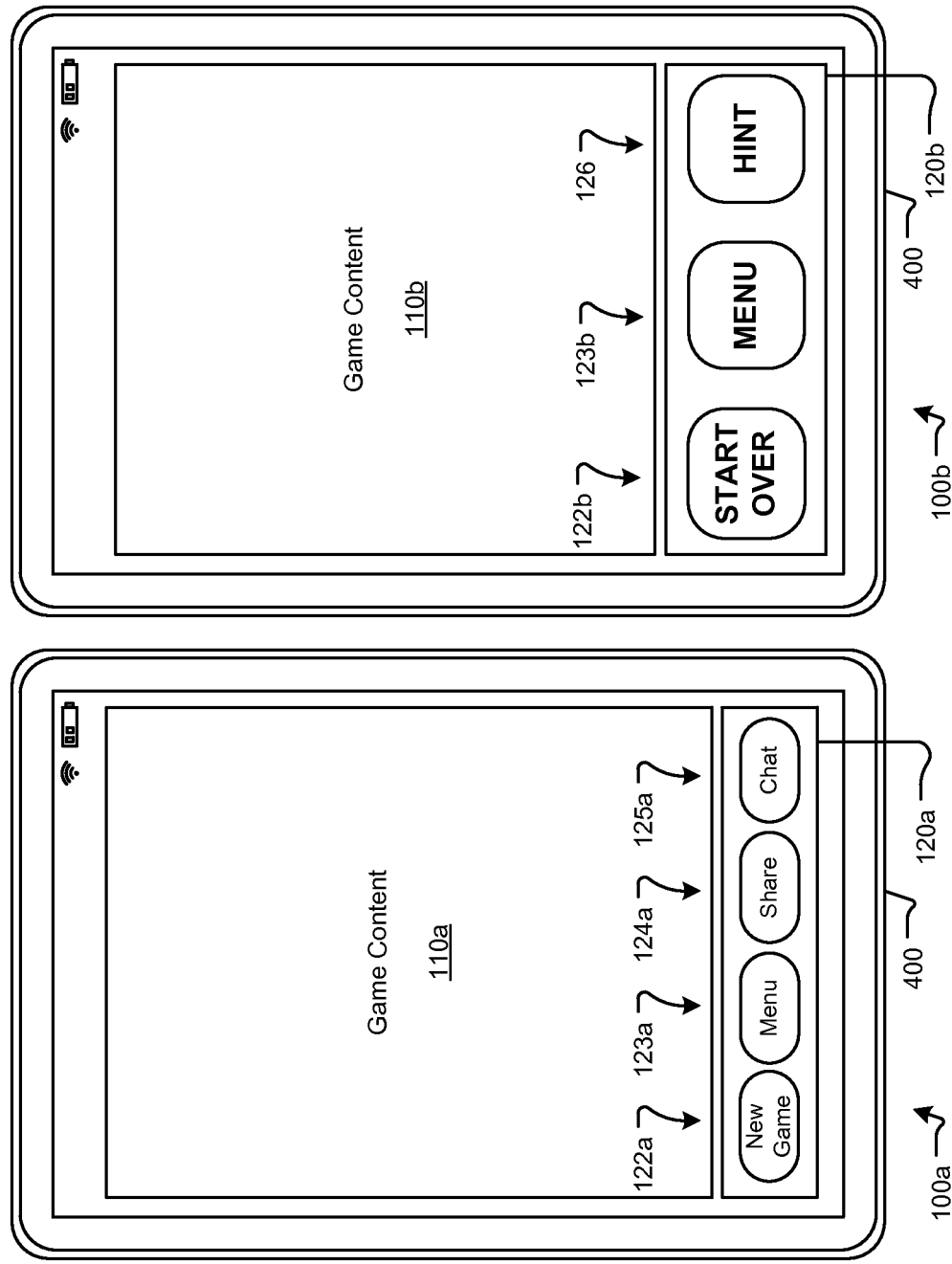
FIG. 1 illustrates first and second modes of operation of a gaming software application, in accordance with embodiments of the present invention.

FIG. 1 illustrates first and second modes of operation of a gaming software application, in accordance with embodiments of the present invention. The software application may run on a computing device 400, such as a touch-sensitive tablet computer. In the first mode of operation 100a, a content portion 110a of the application interface contains the interactive game content of the gaming software application. A control portion 120a includes a plurality of graphical elements comprising virtual buttons 122a-125a. Each of these virtual buttons 122a-125a may be selected by the user by touching the portion of the screen on which the virtual button 122a-125a is displayed.

In the illustrated simplified example, the control portion 120a includes a "New Game" button 122a, "Menu" button 123a, a "Share" button 124a, and a "Chat" button 125a. When the "New Game" button 122a is selected by the user, the software application to terminates the current game being played and starts a new game. When the "Menu" button 123a is selected, a main menu for the gaming software application is displayed. When the "Share" button 124a is selected, the user is presented with various options for sharing information with other users or other computing devices, such as for sharing information regarding the user's score or status in the current game being played. For example, the "Share" button 124a may cause the gaming software application to generate a window in which the user may select from a plurality of sharing options, such as generating an e-mail message to be sent to another user, generating a text message to be sent to another user, or posting the user's score or status to a website, such as a social media website, where it can be viewed by other users. When the "Chat" button 125a is selected, the software application initiates a live chat session with another user.

When the current user is an adult, it would be desirable for the gaming software application to provide the user with all of the features and functionality available. Therefore, in the first mode of operation 100a, which is targeted to adults, all of the buttons 122a-125a in the control portion 120a are displayed and available for use by the user.

When the current user is a child, it may be desirable and/or legally required that the software application prohibit the child from contacting other users or sharing information about the child with other users. Therefore, the gaming software application includes code for operating in a second mode 100b, in which certain features or functionality are modified, added, or eliminated from what is available in the first mode 100a.

In the illustrated embodiment, the second mode 100b includes several operational changes from the first mode. First, the "Share" button 124a and the "Chat" button 125a are eliminated from the control portion 120b, because when the software application is running in the second mode 100b for children, the sharing of any information or communication with other users is prohibited. Therefore, the "Share" and "Chat" buttons are not displayed.

The second mode 100b is not limited to merely eliminating features or functionality, and in some embodiments, certain features or functionality may be added in the second mode 100b. For example, in the illustrated embodiment, a "Hint" button 126 is provided, which, when selected, provides the user with assistance in playing the game. It may be desirable for the "Hint" button 126 not be provided when the user is an adult and the application is running in the first mode 100a.

Other changes may be implemented in the second mode 100b for children. For example, the presentation of the graphical elements may be modified so as to be more suitable for the targeted profile, e.g., children. In the illustrated example, the control portion 120b consumes a larger portion of the overall display of the computing device 400, and each of the buttons 122b, 123b, 126 displayed in the control portion 120b is larger and more widely spaced from adjacent buttons so as to permit easier selection by children with potentially less finger dexterity than adults. In addition, the font of the text displayed in the buttons 122b, 123b, 126 may be enlarged for easier reading.

In some embodiments, the graphical elements may be displayed differently in the first and second modes, even when the underlying function corresponding to the graphical element is the same. For example, in the adult first mode 100a, the button 122a for starting a new game displays the text "New Game". In the child second mode 100b, the button 122b for starting a new game may display text that is more easily understandable by the target profile, such as "START OVER", or may display a graphical icon that can be understood by users who may have difficult reading.

Figure 2:
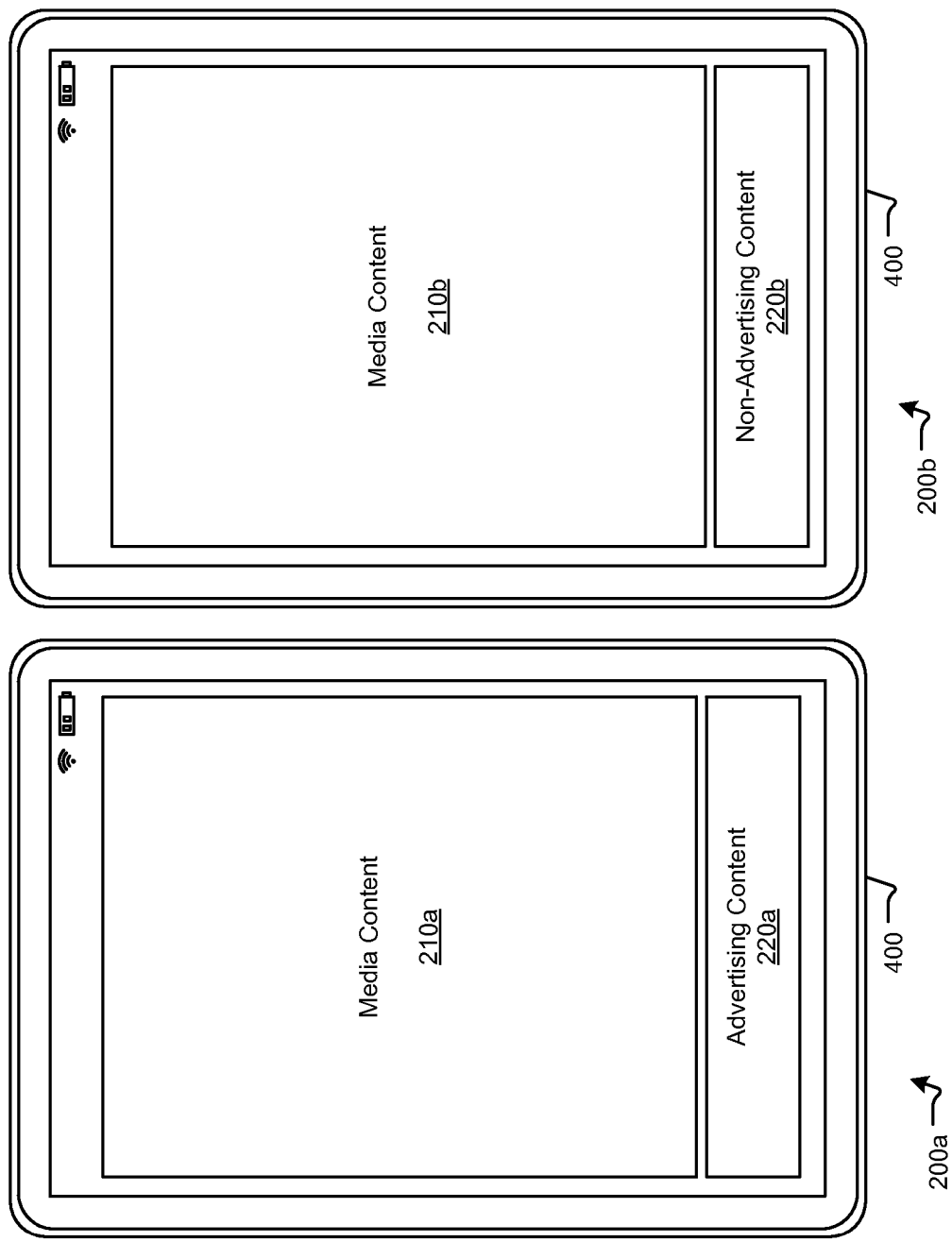
FIG. 2 illustrates first and second modes of operation of a media viewing application, in accordance with embodiments of the present invention.

FIG. 2 illustrates first and second modes of operation of a media viewing application, in accordance with embodiments of the present invention. In this embodiment, the first mode 200a is executed when the software application is launched by an adult user. In this mode, a content portion 210a of the software application displays the selected media, such as an e-book or other digital work for viewing by the adult user. The media viewing application also includes an advertising content portion 220a, which displays advertising content to the user. This advertising content may be, for example, a passive advertisement which displays graphics and/or text to the user advertising some product or service. Alternatively, the advertising content may comprise an interactive advertisement that, when selected by the user, may launch a browser application taking the user to a website with additional information about the product or service being advertised.

When the user launching the media viewing application is a child, it may be desirable to suppress all advertising to the user. In this case, the media viewing application will launch in a second mode 200b, in which the advertising content portion 220a is replaced with a non-advertising content portion 220b. This non-advertising content portion 220b may comprise any form of content that would be acceptable for display to the targeted profile. Alternatively, the non-advertising content portion 220b may be eliminated altogether and the media content portion 210b enlarged to fill the entire display of the computing device 400.

Figure 3:
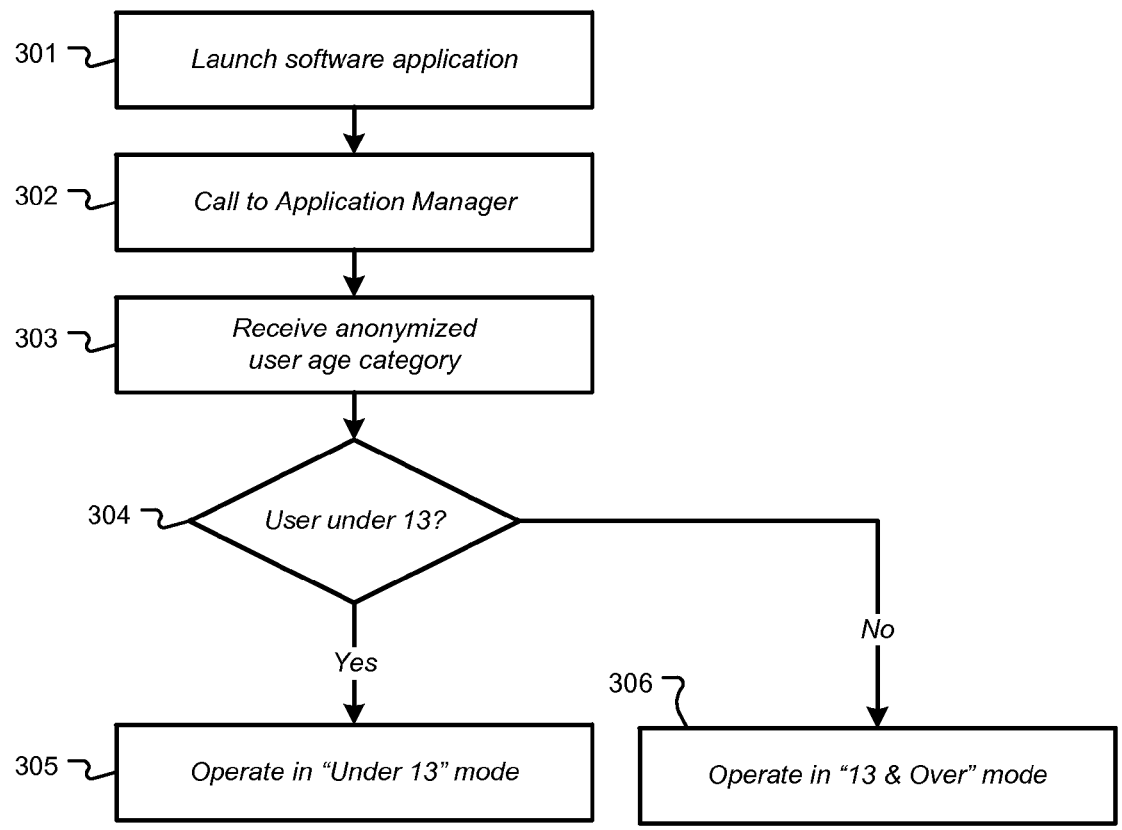
FIG. 3 illustrates an example of a process for managing run-time limitations of third party software applications based on user age, in accordance with embodiments of the present invention.

FIG. 3 illustrates a simple example of a process for managing run-time limitations of third party software applications based on user age, in accordance with embodiments of the present invention. In step 301, a software application is launched on a computing device. In step 302, the software application generates a call to an application manager module requesting user profile information. In step 303, the software application receives from the application manager module an age category of the current user of the computing device, but without any other personally-identifiable information regarding the user. In this embodiment, the application manager module provides one of two age categories: "under 13" or "13 & Over". In step 304, if the software application is informed that the user is in the "under 13" category, then the software application proceeds to step 305, in which it operates in "Child" mode, whereby certain features and functions are suppressed to protect the child's privacy. If the software application is informed that the user is in the "13 & Over" category, then the software application proceeds to step 306, in which it operates in "13 & Over" mode, whereby the software application runs in a full-functionality mode, in which all features and functions are available for use.

Figure 4:
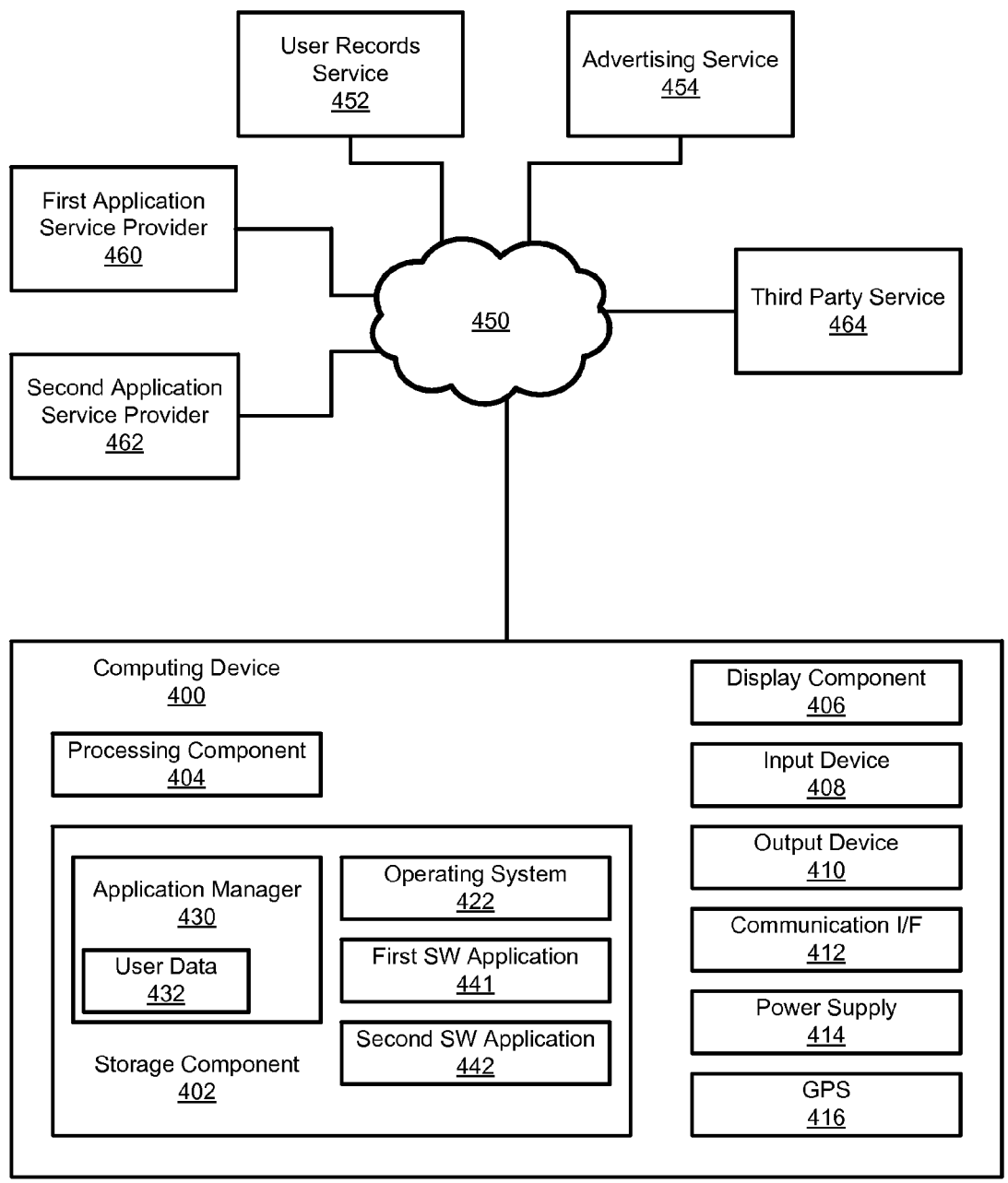
FIG. 4 is a block diagram illustrating an environment in which embodiments of the present invention may be implemented.

FIG. 4 is a block diagram illustrating an environment in which embodiments of the present invention may be implemented. The environment includes one or more computing devices 400 in data communication with other computing devices and services via a network 450. The network 450 includes, for example, the Internet, intranets, extranets, wide area networks (WANs), local area networks (LANs), wired networks, wireless networks, or other suitable networks, etc., or any combination of two or more such networks.

The computing device 400 may comprise, for example, a processor-based system such as a computer system. Although one example of a computing device 400 is shown, it should be understood that various other types of computing devices that are capable of determining, processing, and receiving user input can be used in accordance with various embodiments discussed herein. The computing devices can include, for example, desktop computers, laptop computers, smartphones, electronic book readers, tablet computers, notebook computers, personal data assistants, cellular phones, video gaming consoles or controllers, television set top boxes and portable media players, among others.

The computing device 400 may include a display 406. The display 406 may comprise, for example, one or more devices such as cathode ray tubes (CRTs), liquid crystal display (LCD) screens, gas plasma-based flat panel displays, LCD projectors, or other types of display devices, etc.

The computing device 400 may include one or more input devices 408 operable to receive inputs from a user. The input devices 408 can include, for example, a push button, touch pad, touch screen, wheel, joystick, keyboard, mouse, trackball, keypad, accelerometer, light gun, game controller, or any other such device or element whereby a user can provide inputs to the computing device 400. These input devices 408 may be incorporated into the computing device 400 or operably coupled to the computing device 400 via wired or wireless interface. For computing devices with touch sensitive displays, the input devices 408 can include a touch sensor that operates in conjunction with the display 406 to permit users to interact with the image displayed by the display 406 using touch inputs (e.g., with a finger or stylus). The computing device 100 may also include an output device 410, such as one or more audio speakers.

The computing device 400 may also include at least one communication interface 412, comprising one or more wireless components operable to communicate with one or more separate devices within a communication range of the particular wireless protocol. The wireless protocol can be any appropriate protocol used to enable devices to communicate wirelessly, such as Bluetooth, cellular, or IEEE 802.11. It should be understood that the computing device 400 may also include one or more wired communications interfaces for coupling and communicating with other devices.

The computing device 400 may also include a power supply 414, such as, for example, a rechargeable battery operable to be recharged through conventional plug-in approaches, or through other approaches such as capacitive charging.

The computing device 400 also includes a processing component 404 for executing instructions that can be stored in at least one storage component 402. As would be apparent to one of ordinary skill in the art, the storage component 402 can include one or more different types of memory, data storage or computer-readable storage media, such as, for example, a first data storage for program instructions for execution by the processing component 404, a second data storage for images or data and/or a removable storage for transferring data to other devices.

The storage component 402 may store data and software for execution by the processing component 404, such as, for example, operating system software 422, application manager module 430, and one or more third party software applications (e.g., first software application 441 and second software application 442).

Figure 5:
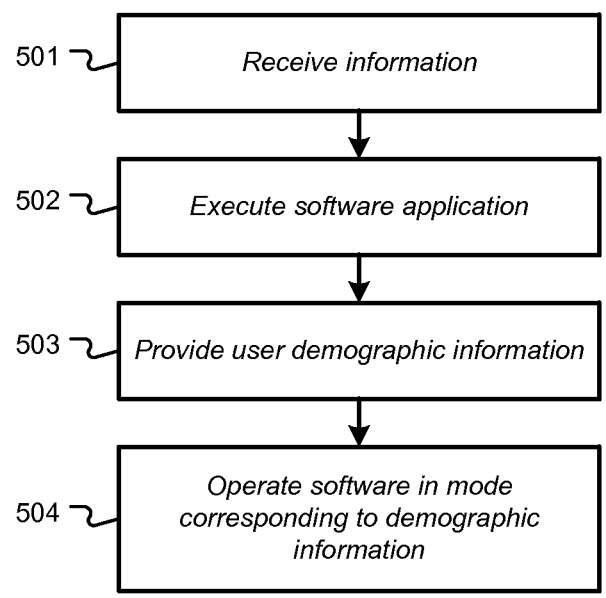
FIG. 5 illustrates an example of a process for managing run-time limitations of software applications based on user profile categories, in accordance with embodiments of the present invention.

FIG. 5 illustrates an example of a process for managing run-time limitations of software applications based on user profile categories, in accordance with embodiments of the present invention. In step 501, information regarding the current user of the computing device 100 is received. This information may be obtained in a variety of ways, such as, for example, user entry or selection of a username corresponding with known user data 432, such as, for example, the user's full name, image, age, address, payment information, and other user account information. For child users, a parent or guardian will typically set up the child user's account with the desired privacy settings and disclosing only the desired amount of information about the child. In some cases, where the application manager module 430 is provided by a known and trusted entity that provides content and services that could be enhanced by knowledge about the child user, the parent may provide personally-identifiable information about the child. The trusted entity providing the application manager module 430 must then ensure that the appropriate consents and protections are in place for that information. In some cases, the user information may be stored in the local storage component 402 of the computing device 400. In other embodiments, the user information may be stored in a remote user records service 452 accessible by the computing device 400 via a secure network connection.

In step 502, a first software application 441 is launched on the computing device 400. In some software applications, the software developer may provide different versions of the software application for use by different types of users, such as a child-focused application or an adult-focused application, with each version being modified to provide the protections, content, and services appropriate for the targeted user. In other cases, the software may include settings that can be manually configured by the user to provide the desired content.

In accordance with embodiments of the present invention, the first software application 441 includes code for operating in a first mode for use by a first profile category and a second mode for use by a second profile category. In response to receiving current user profile information supplied to the software application 201 by the application manager module 430 in step 503, the software application 201 dynamically adapts at run-time to operate in either the first or second mode in step 504.

In accordance with embodiments of the present invention, application developers may produce applications that can be automatically adapted to the current user's profile, without the need for the software application or the software developer to obtain specific user information directly from the user. Instead, the application manager module 430 can obtain the user information with the appropriate consents and protections, and provide anonymized user profile categories as inputs to the software application. At the time that the software developer is creating the software application 441, the developer can choose how to adapt the application 441 for various categories of users. The software application 441 may then be executed on the user's computing device 400 without the need for any specific user information to be obtained by the software application 441 or transmitted to a first service provider 460 for the first software application 441. This can be a particularly useful service to provide to software developers who otherwise may not have the resources to build a legally-compliant system capable of handling personal user information, or may not have developed a sufficient level of trust with users to motivate the users to share personal information with that developer.

The types of user profile categories and corresponding software adaptations may vary. In one embodiment, a second software application 442 may be configured display advertising content during execution of the software by an adult, but when the software application is operating in "Under 13" mode, would suppress those advertisements. When in "Under 13" mode, the advertisements may be eliminated altogether or replaced with advertisements suitable for children under 13, as described above with respect to FIG. 2.

In some embodiments, the advertising to be displayed in the software application 442 is provided to the computing device 400 by an advertising service 454. In some embodiments, the software application 442 will request from the advertising service 454 a category of advertisement based on the user profile category received from the application manager module 430. In other embodiments, the software application 442 may not have any information regarding the content of the advertisements and may not provide any user information to the advertising service 454 when requesting advertisements for display. The user profile information may be transmitted directly from the application manager module 430 to the advertising service 454, bypassing the software application 442. In some embodiments, the entity managing the application manager module 430 is the same entity managing the advertising service 454, thereby providing a complete set of services to the software application 442 and its associated service provider 462.

Typically, revenue received by the service provider 462 from advertisements displayed by software application 442 is an important component of the service provider's business. Accordingly, the loss of revenue due to advertisement suppression when the computing device 400 is operated by a child may be undesirable. In accordance with embodiments of the present invention, when the software application 442 is being operated by a child, a log is retained of advertisements that would have been delivered had the user been an adult. This log may be retained by the application manager module 430 and/or the advertising service 454. In some embodiments, the software developer or service provider 462 associated with the software application 442 may receive some compensation for the suppressed advertisements. The software developer or service provider 462 may receive full or partial compensation for the amount they would have received if the advertisement had been delivered to the user. This may be economically feasible if there was some form of payment received from the user or the user's guardian in exchange for access to advertisement-free software applications, or if the availability of a child-safe application platform provides other desirable benefits, such as customer goodwill or increased third party application development.

In accordance with other embodiments of the present invention, the content or subject matter generated by a software application may be adapted at run-time based on the user profile information. For example, the application manager module 430 may provide user profile information in the form of ratings, such as those used by the Motion Picture Association (e.g., G, PG, PG-13, R, and NC-17) or the Entertainment Software Rating Board (e.g., C, E, E 10+, T, M, and A). After this rating is delivered to the software application by the application manager module 430, the software application will adapt the content of the application to be appropriate for the delivered rating. For example, if an R rating is delivered to a first-person shooter video game application, the game will operate in a mode such that graphic displays of combat are shown. However, if a G rating is delivered to the first-person shooter application, the combat and/or weapons may be replaced by non-violent alternatives.

In accordance with other embodiments of the present invention, the different modes of operation by the adaptive software application correspond to a difficulty level of the software application. For example, if the software application is a videogame, then the different modes of operation correspond to different difficulty levels of that game. The profile information received by the software application may correspond to different types of information that may be useful in determining the appropriate difficulty level for that game. For example, the profile information may correspond to a user's age or age range, in which case the difficulty level selected by the software application may be selected to correspond with the targeted age range (e.g., easier for children, more difficult for adults).

In other embodiments, the profile information may correspond to previously-observed performance levels of the user. For example, if the user has previously played that videogame or some other similar videogame, then the application manager module 430 may store information regarding the user's past performance, such as the user's high score, top level achieved, or other performance data. It may be undesirable or legally prohibited for the videogame software to store information regarding a child user's past performance or usage of that videogame software application. However, the application manager module 430 may provide sufficient privacy protections that it may store this historical user performance information about child users. The application manager module 430 may then provide this past performance information as profile information in anonymized form to the videogame software application, which can then operate in the appropriate difficulty level mode corresponding to that past performance.

The use of varying difficulty levels as different modes of operation for adaptive software applications may have other applications beyond videogames. For example, educational software may utilize anonymized profile information stored by the application manager 430 to provide adaptive modes of operation. For example, the software application may comprise a math learning program or a foreign language program. In this case, the user's age or age range may be provided as anonymized profile information to the software application, which can then adaptively operate in the mode appropriate for that age or age range.

In other embodiments, the user's past performance may be provided as the profile information. For example, the user's past test scores or highest completed level may be stored by the application manager module 430 and provided to the software application as anonymized profile information to be utilized by the software application in determining the appropriate mode of operation. The test scores may be provided, e.g., as raw scores, ranked scores, or as a grade level corresponding to the previously-observed test scores. For example, if a user had previously completed all of the lessons and/or tests corresponding to an eighth grade French class, then the next time the user launches the French learning application, the application manager module 430 will provide profile information indicating an eighth grade proficiency level in French to the software application. The software application will then operate in a mode suitable for an eighth grade proficiency, without having to directly obtain any personal information about the user.

In accordance with other embodiments of the present invention, the adaptation provided by the software application is related to the interaction with third party services. For example, a software application running in full-featured adult mode may transmit information regarding the user and/or the user's activities to a third party service 464, such as a mobile application analytics service or a social media website. However, when the software application receives profile information indicating that the user is a child, the communications with those third party services 464 may be terminated or modified so as to be appropriate for a child user.

In accordance with other embodiments of the present invention, the adaptation provided by the software application is related to the interaction with hardware and/or software services provided by the computing device 400. For example, many mobile computing devices 400 include a Global Positioning System (GPS) component 416 that enables the computing device 400 to provide GPS location information to software applications running on the computing device 400. These applications may monitor the user's location and broadcast that information to other devices and users. However, when a software application receives user profile information indicating that location services should not be utilized, that function would be suppressed.

Other types of services that may be prevented or modified by the software application based on the user profile information include, for example, messaging services (e.g., text messaging and email), use of the camera, transmission of images locally stored on the computing device 400 to other devices on the network 450, telecommunications services (e.g., videoconferencing, telephone, etc.), and purchasing and payment services, such as in-application purchasing services.

In accordance with various embodiments described herein, the software applications are programmed to adapt at run-time to accommodate the user profile information provided by the application manager module 430. In other embodiments, one or more adaptations may be provided by the application manager module 430 without interaction with the software application. For example, in one embodiment described above, the software application would suppress its use of the computing device's GPS services when the user is a child. In other embodiments, the application manager module 430 would transmit a control signal directly to the operating system 422 and/or the GPS module 416 to restrict the software application's use of the GPS module 416 or other services of the computing device 400.

Embodiments of the present invention may provide various advantages not provided by prior art systems. For example, the application management service may permit software developers to more easily produce and distribute content and applications to all users, including minors, without concern for obtaining the legally-required parental consents.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:
1. A computing device, comprising:
a display;
a processing component; and
a non-transitory computer-readable memory storing computer-executable instructions which when executed cause the processing component to:
  receive, from an application manager, information associated with a first user of a first age category, the application manager from a first software provider;
  execute a first software application in a first mode of the first software application, the first mode of the first software application corresponding to the first age category that is different than a second age category associated with a second mode of the first software application, the first software application being from a second software provider; and
  execute a second software application in a first mode of the second software application, the first mode of the second software application corresponding to the first age category that is different than the second age category associated with a second mode of the second software application, the second software application from a third software provider.
2. The computing device of claim 1, wherein the computer-executable instructions cause the processing component to:
receive personally-identifiable information regarding the first user; and
receive, from the application manager, information associated with a second user of the second age category, wherein the information associated with the second user does not include personally-identifiable information about the second user.

3. The computing device of claim 1, wherein the computer-executable instructions cause the processing component to:
execute the first software application in the first mode of the first software application by transmitting data from a first computing device of the first user to a second computing device; and
receive, from the application manager, information associated with a second user of the second age category; and executing the first software application in the second mode of the first software application, whereby the second mode of the first software application prevents transmission of data from the first computing device to other computing devices.

4. The computing device of claim 3, wherein the computer-executable instructions cause the processing component to execute the first software application by preventing one or more of: transmission of information regarding an identity of the second user, transmission of information regarding use of the computing device by the second user, or transmission of a message from the second user to another user.

5. The computing device of claim 1, wherein:
the first age category comprises a first age range and the second age category comprises a second age range, wherein the second age range corresponds to a younger age range than the first age range.

6. A method of executing software applications based on user profile categories, comprising:
executing, using a processor, a first software application programmed to operate in a first mode of the first software application, the first mode of the first software application corresponding to a first profile category that is different than a second profile category associated with a second mode of the first software application, the first software application being from a first software provider;
receiving profile information of a first user;
determining that the profile information of the first user is associated with the first profile category;
operating the first software application in the first mode; and
executing, using the processor, a second software application programmed to operate in a first mode of the second software application, the first mode of the second software application corresponding to the first profile category that is different than the second profile category associated with a second mode of the second software application, the second software application being from a second software provider.

7. The method of claim 6, further comprising receiving profile information comprising information relating to an age of the first user or an age range of the first user.

8. The method of claim 6, further comprising:
receiving, by the first software application, information identifying the first user;
receiving profile information of a second user;
determining that the profile information of the second user is associated with the second profile category; and
operating the first software application in the second mode of the first software application, whereby the first software application does not receive information identifying the second user.

9. The method of claim 6, wherein the first profile category comprises a first age range and the second profile category comprises a second age range, wherein the second age range corresponds to a younger age range than the first age range.

10. The method of claim 6, further comprising storing, using an application manager, user information identifying the first user.

11. The method of claim 6, further comprising:
transmitting information regarding the first user from a first computing device to a second computing device;
receiving profile information of a second user;
determining that the profile information of the second user is associated with the second profile category; and
operating the first software application in the second mode of the first software application, whereby the first software application does not transmit information regarding the second user to another computing device.

12. The method of claim 6, further comprising:
transmitting data from a first computing device to a second computing device;
receiving profile information of a second user;
determining that the profile information of the second user is associated with the second profile category; and
operating the first software application in the second mode of the first software application, whereby the first software application does not transmit data to another computing device.

13. The method of claim 6, further comprising:
storing information regarding the first user after termination of execution of the first software application;
receiving profile information of a second user;
determining that the profile information of the second user is associated with the second profile category; and
operating the first software application in the second mode of the first software application, whereby the first software application does not store information regarding the second user.

14. The method of claim 6, further comprising:
displaying advertising content;
receiving profile information of a second user;
determining that the profile information of the second user is associated with the second profile category; and
operating the first software application in the second mode of the first software application, whereby the first software application prevents display of advertising content to the second user.

15. The method of claim 14, further comprising transmitting to an advertising service information regarding advertising content not displayed during operation in the second mode.

16. The method of claim 6, further comprising:
utilizing location-based services by the first software application or effectuating purchase of goods or services by the first user via the first software application;
receiving profile information of a second user;
determining that the profile information of the second user is associated with the second profile category; and
operating the first software application in the second mode of the first software application, whereby the first software application does not use location-based services or the first software application prevents purchase of goods and services by the second user via the first software application.

17. The method of claim 6, further comprising:
displaying content suitable for the first profile category;
receiving profile information of a second user;

determining that the profile information of the second user is associated with the second profile category; and operating the first software application in the second mode of the first software application, whereby the first software application displays content suitable for the second profile category.

18. The method of claim 6, further comprising:

executing an application manager on a computing device;

receiving profile information of a second user;

determining that the profile information of the second user is associated with the second profile category; and operating the first software application in the second mode of the first software application, whereby the application manager prohibits access to one or more software services of the computing device.

19. The method of claim 6, further comprising:

operating the first software application at a first difficulty level targeted to a first age range associated with the first profile category;

receiving profile information of a second user;

determining that the profile information of the second user is associated with the second profile category corresponding to a second age range; and operating the first software application in the second mode of the first software application at a second difficulty level targeted to the second age range.

20. The method of claim 6, further comprising:

receiving profile information of the first user determined based on prior interaction of the first user with the first software application;

operating the first software application at a first performance level targeted to a first age range associated with the first profile category;

receiving profile information of a second user;

determining that the profile information of the second user is associated with the second profile category corresponding to a second age range; and operating the first software application in the second mode of the first software application at a second performance level targeted to the second age range.

* * * * *